Feb. 19, 1929.
S. RUBEN
1,702,950
METHOD AND APPARATUS FOR PROMOTING CHEMICAL REACTIONS
Filed Feb. 15, 1926
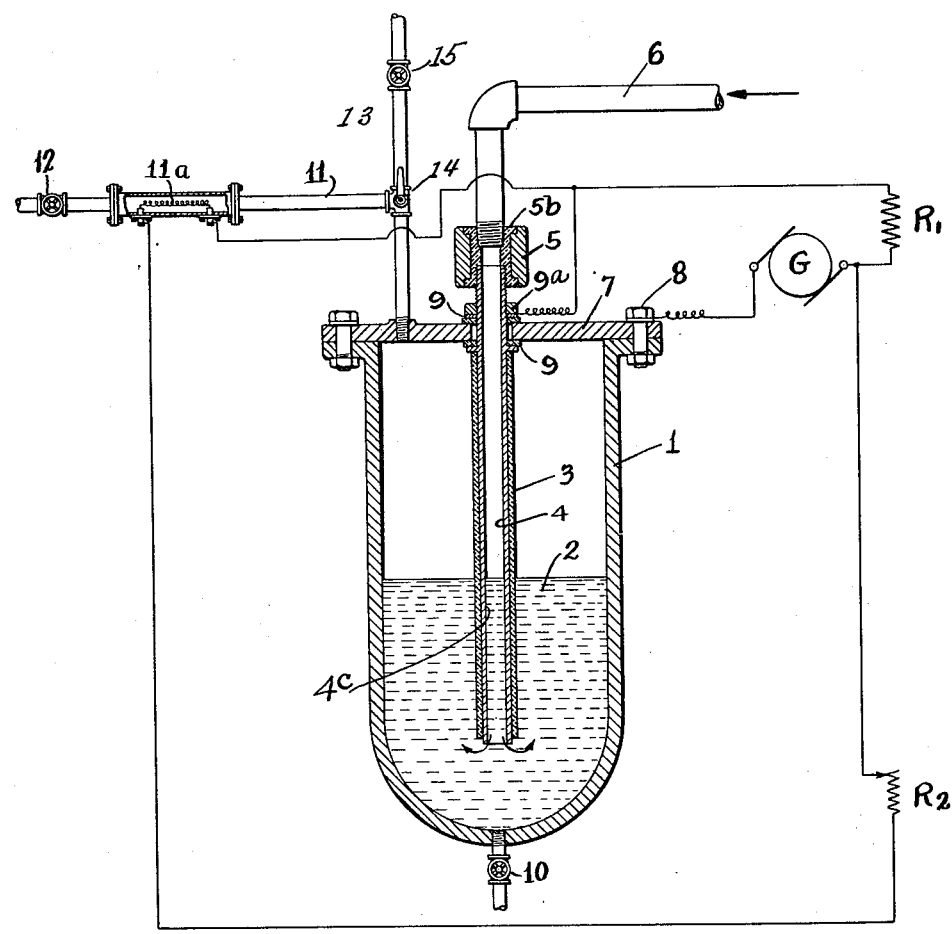
Inventor
SAMUEL RUBEN Patented Feb. 19, 1929.

1,702,950

UNITED STATES PATENT OFFICE.

SAMUEL RUBEN, OF NEW YORK, N. Y.

METHOD AND APPARATUS FOR PROMOTING CHEMICAL REACTIONS.

Application filed February 15, 1926. Serial No. 88,434.

This invention relates to a method of and an apparatus for promoting chemical reactions, more particularly for promoting chemical reactions between gases.

The present invention comprises an improvement over that described in U. S. Letters Patent, No. 1,431,047, issued to me October 3, 1922, which employs a high frequency discharge to effect a combination of the elements of a gaseous mixture. Broadly, my present invention comprises a method of and an apparatus for combining gases within a conductive liquid by the application of a continuous current, one of the gases being admitted under pressure into contact with another gas within the liquid, the mixture being maintained under pressure. Preferably the other gas is in a nascent state and is the product of electrolysis of the containing liquid.

I have found that a catalyst element accelerates various chemical reactions by acting as a local source of potential; that is, it electrostatically charges the reaction elements throughout its radial field, under the influence of heat. I have also found that that agent may be energized by other means than heat, as by radiations of sort wave lengths, as by exposure to ultra violet radiations and to the longer radiations of the X-ray series. These radiations apparently effect radial extension of the electrical field about the catalyst. The potential gradient of the field and the radius of distribution are dependent upon the molecular or crystal structure of the materials used. By applying this theory to the direct electrical acceleration of reactions, I have duplicated many of the catalytic reaction processes.

The method applied in accordance with the terms of my invention is especially well adapted to combining inert gases, such as nitrogen, with other gases, such, for instance, as hydrogen in the production of ammonia and nitric acid. I have discovered that if a gas under pressure is brought into contact with another gas, for instance, nitrogen with hydrogen, as the latter is electrolytically produced, and the potential applied is high enough to ionize the gaseous mixture and to discharge through the hydrogen gas current blocking layer at the electrode surface, a chemical reaction or combination of the gases is efficiently effected. This method of obtaining a discharge through the evolved gas, especially when in physical mixture with the gas with which it is to be chemically combined, is by utilizing a potential for the electrolysis greater than the ionization potential of the electrolytically-formed gaseous film or layer about the electrode. This film potential is determined by the current density, the external pressure and the added gas. The greater the amount of gas at the electrode surface, the higher the spark potential required. Fundamentally, the applied potential must be greater than the decomposition voltage of the solution and then the ionization or spark potential of the electrolytically-formed gaseous layer. The spark or disruptive discharge through the current-blocking gaseous layer at the electrode surface partially disintegrates the diatomic gaseous systems into monatomic, and the energy of recombination produces or accelerates the ammonia reaction.

A preferred method for producing a nitrogen-hydrogen compound is by passing nitrogen under pressure into a solution of an alkaline metal hydrate, such as lithium hydroxide, at the negative of the submerged electrodes, charged at a relatively high or ionizing potential. The union of the nitrogen gas is further accelerated by the influence of the alkaline metal hydrate and by the radiations of low wave length generated by the gaseous discharge; the reaction product is ammonia. If a further reaction is desired, the ammonia product in a mixture with the generated oxygen, may be discharged into a vessel in contact with a highly activated catalytic agent, such as a heated platinum body, when another reaction takes place, yielding nitric acid and water. As the gases are mixed under pressure about the surface of the electrode, the electrolyte becomes the opposing electrode and, as the high ionizing potential discharges through the gaseous mixture, it promotes the chemical reaction. But until the potential is sufficient, the gases block the current completely.

The reaction process is therefore intermittent; when the spark discharges through the gaseous mixture the gases are chemically combined and a thermal expansion takes place, causing a gas diffusion and a reduction of the potential drop at the electrode permitting further electrolytic action and the accumulation of a current-blocking gas film until the potential is sufficient to effect a spark discharge and the resultant gas combination. These cycles are at the rate of about 2,000 per second.

With the operation of such an arrangement the cathode surface is in a glow due to the spark or ionic discharges; when the gas is maintained at a relatively high pressure, the glow is notably increased.

I have found that without the spark or high potential discharge through the gaseous film about the electrodes, even though the gases are under pressure at the cathode surface, the reaction is of relatively small value; however, pressure very materially aids the reaction. The larger reaction is due to the spark discharge through the mixture under pressure at the cathode surface, on account of the ionizing potential of the electrolyzing current or that of a high potential condenser discharge which may be superimposed, as shown in my said patent.

In the device to be described, the metal container is utilized as the anode. If desired, metallic mercury may be added to the surface of the container; the mercury then serves as the anode surface and added catalytic effect is had due to its presence.

Reference is made to the accompanying drawing which diagrammatically illustrates an apparatus constructed according to the terms of my invention and applied to promoting chemical reactions between gases, and particularly in employing electrolysis in the production of one of the gases to be combined.

In the drawing referred to, 1 represents a metal walled container having a drain pipe and valve 10, and containing a solution of lithium hydroxide, projecting into which is an iron oxide tube 4, oxidized through having been heated to 1,000 degrees C. in an atmosphere of steam, and having an outside layer of a dielectric material, 3, and extending from inlet pipe 6 through cover 7 of the container, clamped thereto by bolts 8. At 9 are insulating washers and at $9_a$, retaining bolts. Metal pipes 4 and 6 are held in rigid connection by a collar or coupling of a dielectric material, $5_b$, which is covered by metal collar 5. G is a source of direct current, connecting with the metal wall of container 1, as the positive electrode in the circuit, and with tube 4 as the opposing electrode, exposed within solution 2 over a small area at $4_c$. $R_1$ and $R_2$ represent current control devices in their respective circuits. At 13 is the gas outlet pipe, having therein valves 12, 14 and 15. Valve 14 is a two way valve for directing the gas discharge as well as for regulating the gas pressure within the chamber of the container. Between valves 12 and 14 a platinum wire $11_a$ is suspended within pipe 11, adapted to derive a heating current from generator G.

Describing the operation of the process as applied in the production of ammonia and also in the production of nitric acid:

As the electrolyzing current is applied from generator G to the lithium hydroxide, hydrogen is generated at the limited exposed area of electrode 4, and oxygen at the container wall. Through pipe 6 and tube 4 nitrogen is passed under pressure into contact with the nascent hydrogen at the surface of electrode 4. As this mixture forms under pressure at that surface, it acts as a dielectric film, but the potential of the applied current is sufficient to ionize the gaseous mixture and to break through that mixture effecting a chemical combination of the gases, producing in the example cited, ammonia, the product remaining under pressure due to the constricted outlet in pipe 11. As the gases combine, there is a diffusion which assists in permitting the discharge of current therethrough. The current discharge is therefore intermittent, the discharge occurring in cycles of about 2000 per second. During the discharge, there is a luminous glow about the electrode surface, accompanying which there is a short wave radiation which assists in the acceleration of the reaction; at this time the highly heated portion of the solution forms one of the electrodes. Due to the high temperature of the solution, there is no absorption of the combined gases as they pass through the solution.

The ammonia gas is allowed to pass out through pipe outlet; but if it is desired to produce nitric acid, the flow is diverted through pipe 11, past the platinum wire $11_a$ heated to a proper temperature, which then acts as a catalytic agent and converts a portion of the ammonia and oxygen mixture into nitric acid and water by conversion into nitric acid and nitric peroxide, by oxidation.

What I claim is:

1. The method of promoting a reaction between gases which consists in causing the gases to be brought under pressure into contact with each other in a conductive liquid, and passing through the gaseous mixture an electrolyzing current of a potential capable of ionizing said gaseous mixture and discharging an arc therein.

2. The method of promoting a reaction between gases which consists in decomposing a liquid by electrolysis, bringing another gas under pressure into contact with one of the products of said decomposition, and discharging through said gaseous mixture an electrolyzing current sufficiently high in potential to ionize and to cause an arc discharge through said gaseous mixture in said liquid.

3. The method of promoting a reaction between gases which consists in causing the liberation of a gas by electrolysis of a conductive liquid, introducing into said liberated gas within said liquid, another gas under pressure and passing the electrolyzing current through said mixture within the liquid at a potential greater than the spark potential of said gaseous mixture.

4. The method of promoting a chemical reaction between gases which consists in bringing two gases under pressure into contact adjacent the surface of an electrode in a conductive liquid, and in discharging from said electrode through the mixture of said gases while within the liquid, an electrolyzing current of a potential higher than the ionizing potential of said mixture and discharging an arc through the mixture.

5. The method of producing ammonia which consists in introducing nitrogen under pressure into a conductive liquid in proximity to an electrode, causing hydrogen to be liberated at said electrode and discharging from said electrode an electrolyzing current having a potential sufficiently high to ionize and effect an arc discharge through said gaseous mixture while within the liquid.

6. The method of producing ammonia which consists in introducing nitrogen under pressure into a solution of an alkaline metal hydrate in proximity to an electrode therewithin, causing hydrogen to be electrolytically liberated in said solution and ionizing the mixture of said gases by a direct current arc discharge through the gaseous mixture.

7. The method of producing a nitrogen compound which consists in introducing nitrogen under pressure into a conductive liquid in proximity to an electrode therein, causing gases to be liberated by electrolysis of said liquid, chemically combining said nitrogen and one of said liberated gases within said liquid by discharging through the mixture of said two gases a disruptive direct current of potential high enough to ionize said gaseous mixture, and of combining a portion of said chemically combined gases with another of said liberated gases by bringing into contact with said last mentioned gas said gaseous compound in the presence of an energized catalytic agent.

8. An apparatus for promoting chemical reactions between gases which comprises a vessel containing a conductive liquid, a conductive conduit extending into said liquid and adapted to discharge a gas under pressure into contact with another gas within said liquid, said conduit having an outer surface covering of a dielectric material and said conduit being a cathode in an electric circuit, the opposing electrode in said circuit being in contact with said liquid, means for maintaining under pressure the gas within said vessel in a space above said liquid and means for withdrawing said gases from said space.

9. An apparatus for promoting chemical reactions between gases which comprises a vessel containing a conductive liquid, a conductive conduit extending into said liquid and adapted to discharge a gas under pressure into contact with another gas within said liquid, said conduit having an outer surface covering of a dielectric material and said conduit being a cathode in an electric circuit, the opposing electrode in said circuit being in contact with said liquid, means for maintaining under pressure the gas within said vessel in a space above said liquid and means for withdrawing said gases from said space into a chamber in contact with an energized catalytic agent.

10. The method of promoting a reaction between gases which consists in causing the gases to be brought into contact with each other in a liquid while under pressure, and ionizing the gaseous mixture within the liquid by passing a disruptive direct electric current through the gaseous mixture.

11. The method of producing ammonia, which consists in introducing nitrogen under pressure into a solution of an alkaline metal hydrate in proximity to the surface of an electrode immersed in the solution, causing hydrogen to be electrolytically liberated in the solution and discharging a disruptive direct current through the mixture of nitrogen and hydrogen in the solution.

12. The method of producing nitric acid, which consists in introducing nitrogen under pressure into a solution of an alkaline metal hydrate in proximity to the surface of an electrode immersed in the solution, causing hydrogen to be electrolytically liberated in the solution, combining the gases by discharging a disruptive direct current through the gaseous mixture and then passing the gaseous product into a confined space in contact with a heated catalytic agent.

13. An apparatus for producing chemical ractions between gases which comprises a vessel adapted to contain a conductive liquid, a conduit extending into said liquid and adapted to discharge a gas under pressure, and into contact with another gas within and liberated from the liquid, a part of the conduit contacting with the liquid being a dielectric material, the opposing electrode in the circuit being in contact with the liquid, in combination with means for maintaining the gases under pressure within the vessel in a space above the liquid, and means for withdrawing the gases from said space.

14. An apparatus for producing chemical reactions between gases which comprises a vessel adapted to contain a conductive liquid, a conduit extending into said liquid and adapted to discharge a gas under pressure, and into contact with another gas within and liberated from the liquid, a part of the conduit contacting with the liquid being a dielectric material, the opposing electrode in the circuit being in contact with the liquid in combination with means for maintaining the gases under pressure within the vessel in a space above the liquid, and means for withdrawing the gases from said space into a chamber in contact with a heated catalytic agent.

Signed at New York city, in the county of New York and State of New York this 13th day of February A. D. 1926.

SAMUEL RUBEN.